Patented July 31, 1945

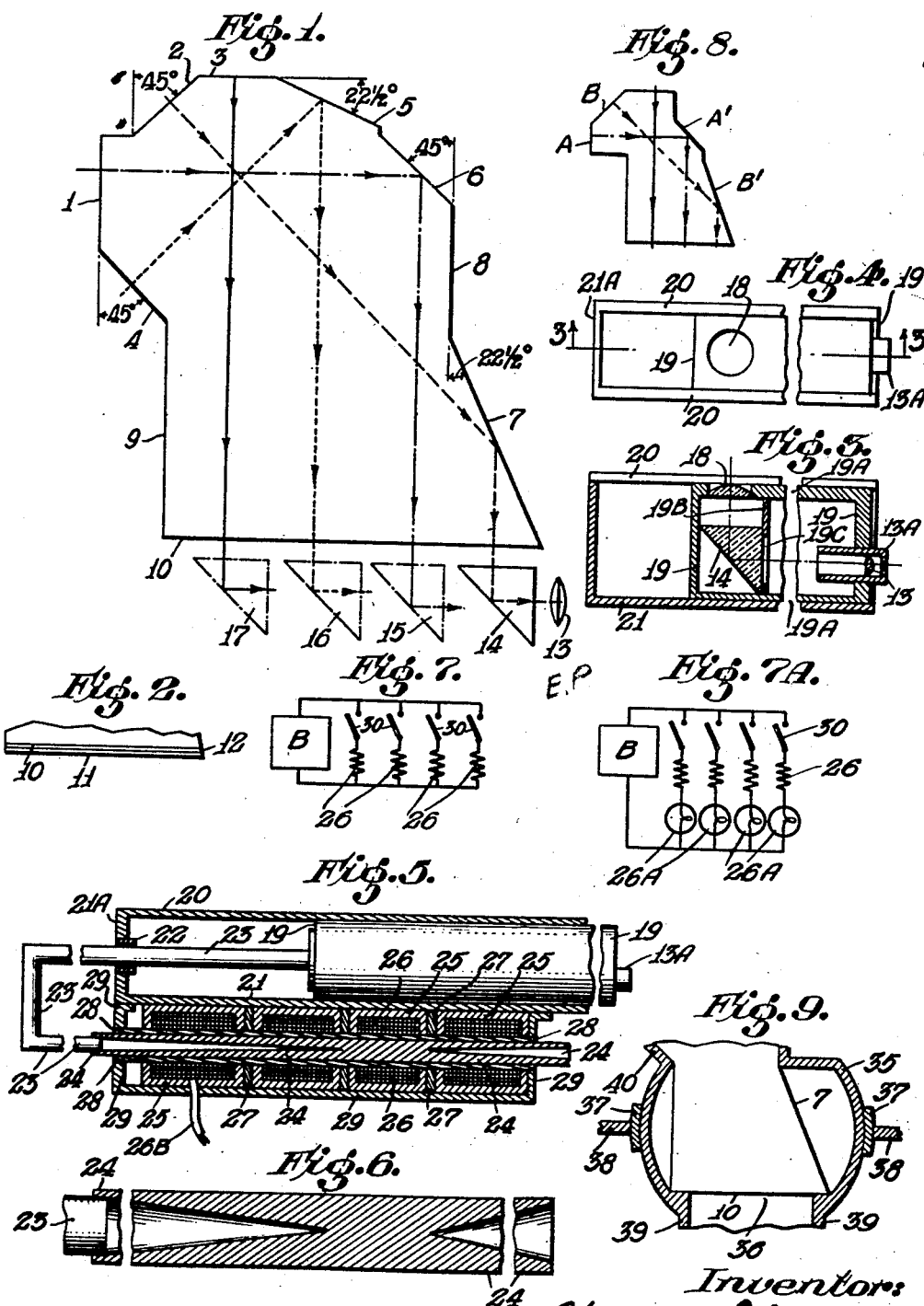

2,380,469

UNITED STATES PATENT OFFICE 2,380,469

PRISM SYSTEM

Herman Schmarion, New York, N. Y.

Application November 1, 1941, Serial No. 417,467

13 Claims. (Cl. 88—1)

The invention relates to improvements in prism systems in which a plurality of prism surfaces are arranged to cooperate in presenting views from all possible directions with a minimum of movement of the prism device, generally a periscope.

The objects of the invention are to provide a means of viewing the outside from an inclosed compartment, such as a tank, submarine, airplane, or the like, and to provide a field of view in as many directions as possible, with as little movement of the instrument, generally a periscope, as possible. While it is primarily intended to provide a viewing means for military purposes, such as in tanks and submarines so that those inside may see an enemy approaching from all directions possible, this system may be used, for example, in an airplane, at least in peacetime, so that it becomes unnecessary to have a sudden rise in the fuselage for the windshield or pilot's window. Thus eliminating the pilot's window permits much better streamlining with obvious consequent advantages. Other uses, may, of course, be found for this useful device.

In the accompanying drawing, Figure 1 is an elevational view of the preferred embodiment; Figure 2 is a sectional view showing the optional positioning of a polarizing means at bottom of the prism proper of Figure 1; Figure 3 is a sectional cross-section showing a construction wherein only one objective lens need be used; Figure 4 is a plan view of the viewing prism and objective system of Figure 3 in its support; Figure 5 is a partially cross-sectional elevation of the electro-magnet automatic positioning means for the viewing prism in Figure 3; Figure 6 is a cross-section showing the electro-magnet plunger in Figure 5; Figure 7 is a diagram of the electro-magnet circuit of Figure 5; Figure 7a is a modification of the circuit shown in Figure 7; Figure 8 is a variation of the main prism of Figure 1, with only 3 viewing surfaces; Figure 9 is a sectional partial cross section of the preferred embodiment in Figure 1, showing suggested means of mounting movably said embodiment.

Figure 1 is an elevation of the preferred main prism system, without objectives being shown. It comprises viewing surfaces and reflecting surfaces cooperating with said viewing surfaces to bring the light ray beams down vertically in the drawing so that prism 14, the viewing or eye prism, may reflect the light at right angles to the eye or eyepiece 13.

From Figures 1 and 8, the formula for the system may be described as a plurality of viewing surfaces and reflecting surfaces, the first viewing surface being disposed at 90 degrees from the horizontal, the second viewing surface facing diagonally upward at an angle of less than 90 degrees from the horizontal, counter-clockwise, and a third viewing surface facing diagonally downward at an angle of less than 90 degrees from the horizontal clockwise. All viewing surfaces are on the same side of the prism, facing their fields of view, each viewing surface, as seen from the aforementioned figures, being perpendicular to its field of view. Each viewing surface has its own reflecting surface cooperating with it. Said first viewing surface admits a light ray beam which is reflected by a reflecting surface disposed at an angle of 45 degrees from the vertical, counter-clockwise. The light ray beam from said second viewing surface is reflected by a reflecting surface disposed at an angle of a certain number of degrees from the vertical, counter-clockwise, said certain number being equal to one-half the number of degrees at which said second viewing surface is disposed from the horizontal, counter-clockwise. Thus, with said second viewing surface being disposed at 45 degrees from the horizonal, counter-clockwise, as in above figures, said reflecting surface is disposed at one-half said number of degrees or 22½ degrees from the vertical, counter-clockwise, which satisfies the formula. In calculating in compliance with this formula, it is seen that when the second viewing surface is 46 degrees from the horizontal counter-clockwise, the second reflecting surface must be one half or 23 degrees from the vertical, counter-clockwise. The light ray beam from said third viewing surface is reflected by a third reflecting surface, said third reflecting surface being disposed at an angle of a certain number of degrees from the horizontal, clockwise, said certain number being equal to one half the number of degrees at which said third viewing surface is disposed from the horizontal, clockwise. Thus, if said third viewing surface, as shown in Figure 1, is disposed at an angle of 45 degrees from the horizontal, clockwise, said third reflecting surface must be disposed at an angle of 22½ degrees from the horizontal, clockwise. If said third viewing surface were disposed at an angle of 46 degrees from the horizontal clockwise, said third reflecting surface must be disposed at an angle of 23 degrees from the horizontal, clockwise. All reflecting surfaces are situated on that side of the prism furthest from the fields of view, that is, on the side opposite to their respective viewing surfaces. The additional viewing surface at 180 degrees from the horizontal, may be added to the prism, as in the above figures, no reflecting surface being necessary. It is obvious, of course, that the purpose of this formula, and the constructions, is to cause the light ray beams from these different fields of view to be reflected downward vertically in separate parallel light ray beams.

Viewing surface 1 is 90 degrees or vertical allowing a light ray beam from a first image to reach reflecting surface 6, which is at 45 degrees from the vertical, counter-clockwise, thence the light ray beam from said first image is reflected through the emerging surface 10 to position 15 of the viewing prism 14, shown in broken or dash lines. The direction of the light ray beam from viewing surface 1 is shown by arrows on the dash-dot line. Viewing surface 2, at 45 degrees from the horizontal, counter-clockwise, brings the light ray beam from a second image to reflecting surface 7, which is at 22½ degrees from the vertical, counter-clockwise, as shown. The light ray beam from said second image is shown by the arrowed broken or dash line. Viewing surface 3 is at 180 degrees or horizontal and brings the light ray beam from a third image down to position 17 of the viewing prism 14. The light ray beam from said third image is shown by unbroken line, with arrows. Viewing surface 4 is at 45 degrees from the horizontal, clockwise, as shown, indicated by the dotted line with arrows showing direction of a light ray beam from a fourth image. This light ray beam is reflected by surface 5, at 22½ degrees from the horizontal, clockwise, as shown, bringing the light ray beam down to position 16, of the viewing prism 14, position 16 being shown by broken or dashed lines. It is seen that the light ray beam of each image, upon passing through the emerging surface 10, is separate from and parallel to all the other light ray beams. For brevity, the word "light" may be used interchangeably with "light ray beam" hereafter. The light is reflected through the viewing prism 14 in any one of its various positions, to the eye or eyepiece 13. It is obvious that, if desired, an objective lens, simple or compound, may be placed in front of the viewing surfaces 1, 2, 3 and 4. However, as shown in Figure 3, in cross-section, by using an arrangement as shown, only one objective lens need be used. The square tubular casing 19, closed at the left end, has the viewing prism 14 in its lower part, and above it, cemented into place is the objective 18, in the circular opening of said tubular casing at its upper part. A prism support 19B has an opening 19C, through which the light is allowed to pass to the eyepiece 13. The prism 14 may, at the surface adjacent to prism support 19B, be cemented thereto. The tubular casing 19 is shown broken at 19A to conserve space in the drawing. The tubular casing 19 slides back and forth in the casing support 21, having flanges 20 at its upper end so that the objective 18 may receive light from above, as shown in the plan view of these in Figure 4, 21A being the end of the casing support. The cross-sectional view of Figure 3 is on the line 3—3 of Figure 4. The tubular casing 19, may be moved by hand. However, as shown in the cross-section elevation in Figure 5, this may be done automatically by electro-magnets, which stop the viewing prism in the exact desired positions almost instantly. This is a distinct advantage, since, especially in military maneuvers, quick sighting of the enemy is essential, whether forward, diagonally up in a plane or directly overhead in a plane. Also when a tank is moving upward on irregular ground, the viewing surface 4, by moving it slightly in the desired position upward, or viewing surface 1, by moving it slightly in the desired position downward, will thus present the forward position of the enemy, even though the tank is pointed upward. This movement of the periscope in no case needs to be more than 22½ degrees. By pressing the button switch 30, that is, the first, second, third or fourth button, the plunger, 24, as explained below, is attracted to position 1, 2, 3 or 4, so that the prism 14 is instantly changed from one position to another, when desired, since the tubular casing 19, and the viewing system within it, are rigidly connected to the plunger 24 by means of the U-bar 23, which enters the tube 22 and is attached to the tubular casing 19, as by soldering. The electro-magnet system comprises four magnet-solenoids, having iron cores 25, windings 26 and the plunger 24, which, as shown in detail in Figure 6 has a central section of high magnetic permeability, which may have a length exactly equal to the length of each individual solenoid-magnet, from one end of the core to the other end of the core. In order to prevent possible escape of flux of each individual magnetic circuit when excited, each solenoid magnet may be separated from the next one by a non-magnetic ring 27. The solenoid plunger 24 has, on each side of said central section of high magnetic permeability, a gradually varying section of lesser magnetic permeability, the length of each of these sections of lesser magnetic permeability being such that, no matter whether the central section of high magnetic permeability is in starting position within the hollow of the solenoid magnet at the right or within any of the other solenoid magnets, each of the four solenoid magnets has a portion of the solenoid plunger 24 throughout the extent of its hollow. The individual solenoid windings 26 each has a pair of insulated leads 26B, which are connected to the switch or push buttons 30, shown in the circuit diagram of Figure 7, each said winding 26 being connected in a separate parallel circuit. When the switch or push button 30 is pressed, closing the circuit of an individual solenoid winding, the section of high magnetic permeability of said plunger is attracted to a position across the length of the individual solenoid magnet, and since the prism 14 and the eyepiece 13 are secured in the tubular casing 19, they are moved a corresponding distance to one of the other positions, the prism 14 going to position 15, 16 or 17, according to the movement of the solenoid plunger 24, which is connected to the tubular casing 19 by means of the U-arm 23. Thus, the prism 14 is moved instantly to the desired position to look in the desired direction. As shown in Figure 7A, a light 26A may be connected in series with each winding. The lights may be of different colors, each different color representing a different direction of view, so that the person viewing may have a check on the actual direction he is looking. The lights may be in a casing, which when lit by said light, shows the proper word, as "Horizontal," "Down," "Diagonal," "Up." This is another way of checking on the actual direction of view, and the position of the prism 14. The eyepiece 13 is mounted in the eyepiece holder 13A, which may be threaded and thus movable back or forward for accurate focusing, or which may be slidable back or forward.

As shown in Figure 2, a polarizing element 12 may be sandwiched between the bottom of surface 10 and a thin piece or plate of glass 11 for the purpose of at least reducing the undesired light rays from the view. 10 is the emerging surface.

Figure 8 is a modification of Figure 1, in which, as seen surfaces 4 and 5 are omitted, which represent the downward view, when this view is not needed, as, possibly, when used in a submarine periscope of this construction. Thus, only three positions are used, instead of the previous four, only three solenoid magnets being used in the electrically operated embodiment. Of course, as already stated, the tubular casing 19, and the optical means therein may be made movable by hand, without the use of the electrical means shown. When operated by hand, the side of the solenoid plunger 24 may be marked by lines numbered 1, 2, 3 or 1, 2, 3 and 4, which numbers and the line indicated thereby, may be in line with an arrow or other marker, indicating that the plunger has stopped in the desired position. This, of course, is optional. The surfaces at the left side of the prism, on the drawing of Figures 1 and 8 are the front part of the prism and the viewing surfaces are the active part of said front part of the prism. The surfaces at the right side of the prism in Figures 1 and 8 are the rear part of the prism and the reflecting surfaces are the active part of said rear part of the prism.

When the light ray beams are referred to as separate and parallel, it is intended to mean that each light ray beam has and remains in its own path and does not enter upon the path of any of the other light ray beams.

Figure 9 shows a suggested mounting for tilting the periscope, and shows that portion of the prism and its casing, of the preferred embodiment of Figure 1, comprising surfaces 10, 7, and 9. Broken section 38 represents a part of the top of, say, the tank through which the periscope projects and suitably attached to this is a concavely curved ring 37. Slidably placed in this ring is a convexly curved portion 35 of the periscope casing which forms a snug fit with the ring 37. This is a modification of a universal joint and allows the periscope to move at least 22½ degrees in all directions. The periscope casing has an opening 36 below the surface 10 of the prism and 39 is a portion of the tube going down to the casing support 21, to which it is attached. This, of course, is a suggested mounting. It is possible to use any other known movable mounting or a rigid or horizontally pivotable mounting, as in the orthodox periscope. When the mounting used is that of the horizontally pivoted type, as in the orthodox periscope, the prism 14 and the eyepiece with it are movable back and forth in the tubular casing 19 to positions 15, 16 and 17 of the prism positions. It would seem that in the case of the submarine periscope, it might be found desirable to use only the horizontal mounting, where the periscope is revolvable horizontally, as in the ordinary periscope, due to the great length of a submarine periscope. In the submarine periscope, too, instead of the lens 18, it is preferable to omit lens 18 and to place, instead, a separate lens in front of each viewing surface, the focal length of each lens being such that the focal length of all creates a focal plane or image plane about equally distant from the principal focus of the eyepiece. This is so that the focusing of the eyepiece does not become complicated and slow.

It will be seen that even with a horizontal mounting, in both the tank and airplane, and the submarine, it is possible to view in almost all degrees in all directions, especially with a wide angle lens in front of each viewing surface. This is, in war, especially necessary for a tank and submarine, when enemy airplanes come suddenly upon them from above.

Variations of the construction, may, of course, be made within the scope of the claims.

I claim:

1. A prism of the class described, comprising a plurality of viewing surfaces and a plurality of reflecting surfaces, said viewing surfaces including a first viewing surface disposed at an angle of 90 degrees from the horizontal, a second viewing surface facing diagonally upward at an angle of less than 90 degrees from the horizontal, counter-clockwise, and a third viewing surface facing diagonally downward at an angle of less than 90 degrees from the horizontal clockwise; a first reflecting surface for reflecting the light ray beam from said first viewing surface, said first reflecting surface being disposed at an angle of 45 degrees from the vertical, counter-clockwise, a second reflecting surface for reflecting the light ray beam from said second viewing surface, said second reflecting surface being disposed at an angle of a certain number of degrees from the vertical, counter-clockwise, said certain number being equal to one-half the number of degrees at which said second viewing surface is disposed from the horizontal, counter-clockwise, a third reflecting surface for reflecting the light ray beam from said third viewing surface, said third reflecting surface being disposed at an angle of a certain number of degrees from the horizontal, clockwise, said certain number being equal to one half the number of degrees at which said third viewing surface is disposed from the horizontal, clockwise, said viewing surfaces being disposed, each toward its own field of view so that the light ray beam from its own field of view is perpendicular to its own viewing surface, said reflecting surfaces reflecting said light ray beams so that they are separate and parallel, a single emerging surface on said prism, said separate parallel light ray beams emerging from said prism at said single emerging surface.

2. A prism of the class described according to claim 1, in combination with a right-angled prism for viewing each of said light ray beams separately, said right-angled prism being movable at right angles to said parallel light ray beams.

3. A prism of the class described comprising a first viewing surface at an angle of 90 degrees from the horizontal for admitting a first light ray beam into said prism, a first reflecting surface at an angle of 45 degrees from the vertical counter-clockwise for reflecting said first light ray beam; a second viewing surface at an angle of 45 degrees from the horizontal clockwise for admitting a second light ray beam into said prism, a second reflecting surface at an angle of 22½ degrees from the horizontal clockwise for reflecting said second light ray beam; a third viewing surface at an angle of 45 degrees from the horizontal counter-clockwise for admitting a third light ray beam into said prism, a third reflecting surface at an angle of 22½ degrees from the vertical, counter-clockwise, for reflecting said third light ray beam; said viewing surfaces being on the side of said prism nearest their fields of view and opposite to that side of said prism on which said reflecting surfaces are situated, each of said viewing surfaces admitting a light ray beam perpendicular to its own viewing surface, each of said reflecting surfaces reflecting one of said light ray beams striking it so that all of said light ray beams are separate and parallel, and an emerging surface, said parallel light ray beams emerging from said emerging surface.

4. A prism of the class described according to claim 3 and a fourth viewing surface at an angle of 180° from the horizontal, for admitting a fourth light ray beam which is perpendicular to its own viewing surface and in a direction parallel to said other parallel light ray beams, said fourth light ray beam requiring no reflection and emerging through said emerging surface separate from and parallel with said reflected parallel light ray beams.

5. A prism of the class described comprising a first viewing surface at an angle of 90 degrees from the horizontal for admitting a first light ray beam into said prism, a first reflecting surface at an angle of 45 degrees from the vertical, counter-clockwise for reflecting said first light ray beam; a second viewing surface at an angle of 45 degrees from the horizontal counter-clockwise for admitting a second light ray beam into said prism, a second reflecting surface at an angle of 22½ degrees from the vertical counter-clockwise for reflecting said second light ray beam; said viewing surfaces being on the side of said prism nearest their fields of view and opposite to that side of said prism on which said reflecting surfaces are situated, each of said viewing surfaces admitting a light ray beam perpendicular to its own viewing surface, each of said reflecting surfaces reflecting one of said light ray beams striking it so that both of said light ray beams are separate and parellel, and an emerging surface, said parallel light ray beams emerging from said emerging surface.

6. A prism of the class described according to claim 5 and a third viewing surface at an angle of 180 degrees from the horizontal, for admitting a third light ray beam which is perpendicular to its own viewing surface in a direction parallel to said other parallel light ray beams, said third light ray beam requiring no reflection and emerging through said emerging surface separate from and parallel with said reflected parallel light ray beams.

7. A prism of the class described comprising a first viewing surface at an angle of 90 degrees from the horizontal for admitting a first light ray beam into said prism, a first reflecting surface at an angle of 45 degrees from the vertical, counter-clockwise for reflecting said first light ray beam; a second viewing surface at an angle of 45 degrees from the horizontal clockwise for admitting a second light ray beam into said prism, a second reflecting surface at an angle of 22½ degrees from the horizontal clockwise for reflecting said second light ray beam; said viewing surfaces being on the side of said prism nearest their fields of view and opposite to that side of said prism on which said reflecting surfaces are situated, each of said viewing surfaces admitting a light ray beam perpendicular to its own viewing surface, each of said reflecting surfaces reflecting one of said light ray beams striking it so that both of said light ray beams are separate and parallel, and an emerging surface, said parallel light ray beams emerging from said emerging surface.

8. A prism of the class described, comprising a plurality of viewing surfaces and a plurality of reflecting surfaces, said viewing surfaces including a first viewing surface disposed at an angle of 90 degrees from the horizontal and a second viewing surface facing diagonally upward at an angle of less than 90 degrees from the horizontal, counter-clockwise; a first reflecting surface for reflecting the light ray beam from said first viewing surface, said first reflecting surface being disposed at an angle of 45 degrees from the vertical, counter-clockwise, a second reflecting surface for reflecting the light ray beam from said second viewing surface, said second reflecting surface being disposed at an angle of a certain number of degrees from the vertical, counter-clockwise, said certain number being equal to one-half the number of degrees at which said second viewing surface is disposed from the horizontal, counter-clockwise; each of said viewing surfaces being perpendicular to the light ray beams from its own field of view, said reflecting surfaces reflecting said light ray beams so that they are separate and parallel, a single emerging surface on said prism, said separate and parallel light ray beams emerging from said prism at said single emerging surface.

9. A prism in the class described, according to claim 8, and a right-angled prism for viewing said separate light ray beams separately upon emerging from said prism, said right-angled prism being movable perpendicular to each of said parallel light ray beams.

10. A prism of the class described, comprising a plurality of viewing surfaces and a plurality of reflecting surfaces, said viewing surfaces including a first viewing surface disposed at an angle of 90 degrees from the horizontal, a second viewing surface facing diagonally downward at an angle of less than 90 degrees from the horizontal clockwise; a first reflecting surface for reflecting the light ray beam from said first viewing surface, said first reflecting surface being disposed at an angle of 45 degrees from the vertical counter-clockwise, a second reflecting surface for reflecting the light ray beam from said second viewing surface, said second reflecting surface being disposed at an angle of a certain number of degrees from the horizontal, clockwise, said certain number being equal to one half the number of degrees at which said second viewing surface is disposed from the horizontal, clockwise, each of said viewing surfaces being perpendicular to the light ray beam from its own field of view, said reflecting surfaces reflecting said light ray beams so that they are separate and parallel, a single emerging surface on said prism, said separate and parallel light ray beams emerging from said prism at said single emerging surface.

11. A prism of the class described, according to claim 10, and a right-angled prism for viewing said separate light ray beams separately upon emerging from said prism, said right-angled prism being movable perpendicular to each of said parallel light ray beams.

12. A prism of the class described, according to claim 3, and a right-angled prism for viewing said separate light ray beams separately upon emerging from said prism, said right-angled prism being movable perpendicular to each of said parallel light ray beams.

13. A prism of the class described, according to claim 5, and a right-angled prism for viewing said separate light ray beams separately upon emerging from said prism, said right-angled prism being movable perpendicular to each of said parallel light ray beams.

HERMAN SCHMARION.